United States Patent
Viswanath et al.

(10) Patent No.: US 11,543,291 B2
(45) Date of Patent: Jan. 3, 2023

(54) PHOTON COUNTING ANALOG FRONT END WITH LOAD BALANCING

(71) Applicant: Texas Instruments Incorporated, Dallas, TX (US)

(72) Inventors: Rakul Viswanath, Bengaluru (IN); Sachin Aithal, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 77 days.

(21) Appl. No.: 17/245,436

(22) Filed: Apr. 30, 2021

(65) Prior Publication Data
US 2022/0349748 A1   Nov. 3, 2022

(51) Int. Cl.
*G01J 1/44*   (2006.01)

(52) U.S. Cl.
CPC .......... *G01J 1/44* (2013.01); *G01J 2001/442* (2013.01); *G01J 2001/444* (2013.01); *G01J 2001/448* (2013.01)

(58) Field of Classification Search
CPC .. G01J 1/44; G01J 2001/442; G01J 2001/444; G01J 2001/448
See application file for complete search history.

(56) References Cited

U.S. PATENT DOCUMENTS 6,353,324 B1 *   3/2002   Uber, III ............ G01R 19/2509
                                                              324/457

* cited by examiner

*Primary Examiner* — Thanh Luu
*Assistant Examiner* — Monica T Taba
(74) *Attorney, Agent, or Firm* — John R. Pessetto; Frank D. Cimino

(57) ABSTRACT

An analog front-end circuit includes an array of pixel circuits. Each pixel circuit includes an event counter and a power consumption circuit. The event counter is configured to count photons incident at the pixel circuit. The power compensation circuit includes an event rate circuit and a current sink circuit. The event rate circuit is configured to determine a rate of photon detection events at the pixel circuit. The current sink circuit is configured to pass a compensation current selected based on the rate of photon detection events at the pixel circuit.

21 Claims, 5 Drawing Sheets

PHOTON COUNTING ANALOG FRONT END WITH LOAD BALANCING

BACKGROUND

The penetrative ability of X-rays makes them valuable for structural imaging applications ranging from medical imaging and materials research to quality control and security. Transmission imaging with X-rays is typically used to produce an attenuation contrast image of the material of interest. However, these images suffer from poor contrast sensitivity that severely limits many applications. X-ray systems that employ photon counting detectors provide a number of advantages over older X-ray technologies that employ energy integrating detectors. For example, using a photon counting detector applying multiple detector energy thresholds, multiple contrast media can be simultaneously imaged and are distinguishable. Accordingly, X-ray systems using photon counting detectors show promise in a variety of applications.

SUMMARY

In one example, an analog front-end circuit includes an array of pixel circuits. Each pixel circuit includes an event counter and a power compensation circuit. The power compensation circuit includes an event rate circuit and a current sink circuit. The event rate circuit includes threshold storage, an event count comparator, an event rate counter, and an event rate register. The event count comparator includes a first input coupled to the event counter, a second input coupled to the threshold storage, and an output. The event rate counter includes an input coupled to the output of the event count comparator, and an output. The event rate register includes an input coupled to the output of the event rate counter, and an output. The current sink circuit is coupled to the output of the event rate register.

In another example, an analog front-end circuit includes an array of pixel circuits. Each pixel circuit includes an event counter and a power consumption circuit. The event counter is configured to count photons incident at the pixel circuit. The power compensation circuit includes an event rate circuit and a current sink circuit. The event rate circuit is configured to determine a rate of photon detection events at the pixel circuit. The current sink circuit is configured to pass a compensation current selected based on the rate of photon detection events at the pixel circuit.

In a further example, a photon counting system includes a photon sensor and an analog front-end circuit coupled to the photon sensor. The photon sensor includes a plurality of photon detectors. The analog front-end circuit includes an array of pixel circuits and a pseudo-random binary sequence (PRBS) generator. Each pixel circuit includes an event counter and a power compensation circuit. The event counter is configured to count photons incident at one of the photon detectors. The power compensation circuit includes an event rate circuit and a current sink circuit. The event rate circuit is configured to determine a rate of photon detection events at the pixel circuit. The current sink circuit is configured to pass a compensation current selected based on the rate of photon detection events. The PRBS generator is configured to generate a randomized initial value loaded into the event counter.

BRIEF DESCRIPTION OF THE DRAWINGS

For a detailed description of various examples, reference will now be made to the accompanying drawings in which.

The same reference numbers are used in the drawings to designate the same or similar (functionally and/or structurally) features.

DETAILED DESCRIPTION

Figure 1:
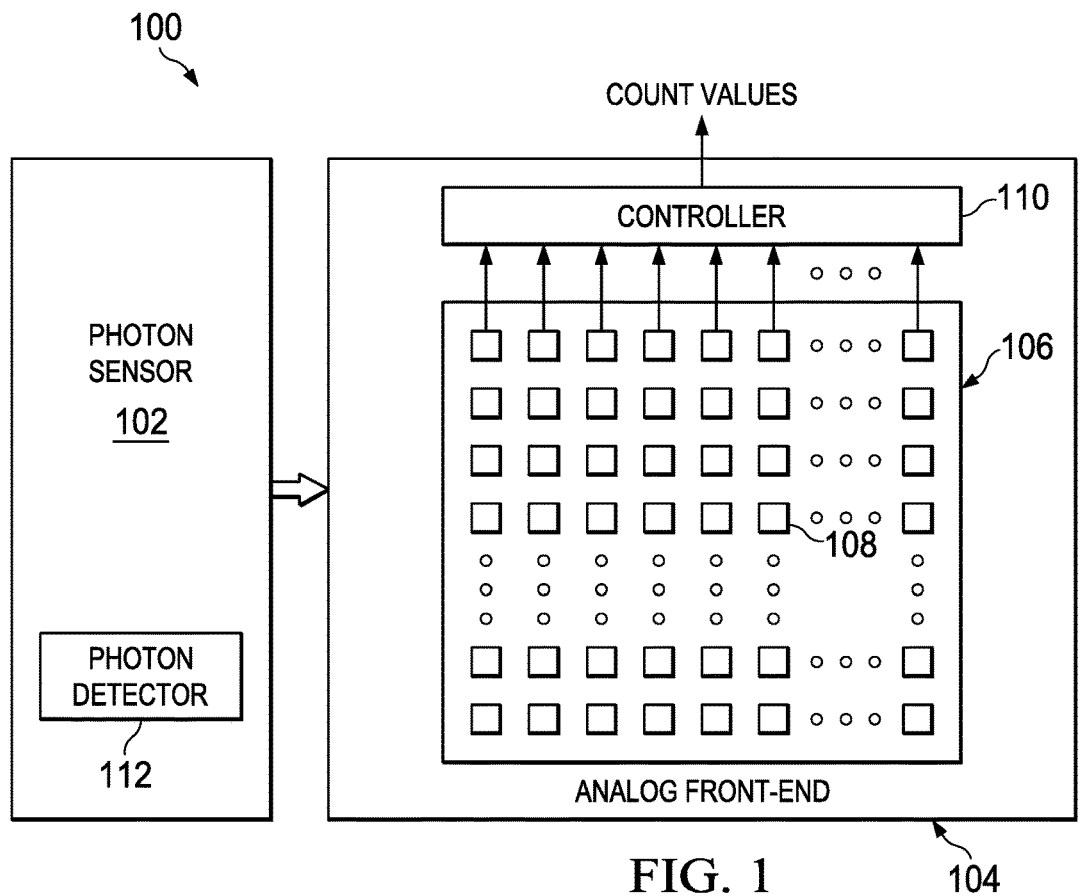
FIG. 1 illustrates a block diagram for an example photon counting system as described herein.

Photon counting systems include a two-dimensional array of photon detectors coupled to an analog front-end circuit. The analog front-end circuit includes an array of pixel circuits, where a pixel circuit is coupled to each photon detector. In the analog front-end circuit, the power consumed by each pixel circuit is dependent on the rate of photon incidence on the photon detector coupled to the pixel circuit. For example, an analog front-end circuit may consume as little as 0.6 watts (W) or as much as 1.2 W based on low and high incidence of photons on the photon detector array. As a result, the temperature of the pixel circuits varies with the rate of photon incidence. The photon detectors used to detect X-rays are temperature dependent, and the variation in pixel circuit temperature can cause image artifacts.

To compensate for the flux dependent power consumption of the pixel circuits, some implementations of an analog front-end circuit monitor the current output of a voltage regulator that powers the pixels circuits and draw a compensation current from the voltage regulator. The compensation current maintains flow of a selected current through the voltage regulator. For example, if the power consumed by the analog front-end circuit at a high rate of photon incidence is 1.2 W, then the compensation current may ensure that the analog front-end circuit consumes about 1.2 W at all levels of photon incidence. However, even if the flow of compensation current is distributed across the pixel circuits, the power consumed by a pixel circuit can still vary based on the rate of photon incidence at the photon detector. Thus, centralized detection of power consumption fails to eliminate thermal gradients in the analog front-end circuit caused by variation in photon incidence.

The analog front-end circuits described herein detect flux in each pixel circuit and independently compensate pixel power consumption based on the detected flux. Thus, detection and compensation are distributed. Each pixel circuit adjusts its power consumption based on the count of photons (events) incident on the photon detector coupled to the pixel circuit. For example, the compensation current drawn by the pixel circuit may be higher for a lower event count value, and lower for a higher event count value, where incidence of photon energy above a predetermined threshold defines an event. The analog front-end circuits may apply compensation current in discrete steps (quantized compensation steps). Because of the discrete compensation steps, a small change in flux can produce a relatively large change in compensation current. The analog front-end circuits may also dither the photon count values to randomize the variation of quantized compensation steps, which reduces the effective size of the compensation steps. The dither may be produced by loading a randomized initial value into an event counter prior to the start of a photon counting interval. A final count value may be corrected by subtracting the randomized initial value from the event counter output at the end of the photon counting interval.

Some example embodiments include a channel-level flux detection and power compensation scheme based on previous flux-dependent power changes (e.g. increases). Some example embodiments include an event counter with randomized initialization to dither count-rate thresholds. Some example embodiments use an equal-to comparator for pseudo-random bit sequence comparisons.

FIG. 1 illustrates a block diagram for an example photon counting system 100. The photon counting system 100 includes a photon sensor 102 and an analog front-end circuit 104. The photon sensor 102 includes an array (e.g., a two-dimensional array) of photon detectors 112. Each photon detector 112 (e.g., a cadmium telluride (CdTe) or cadmium zinc telluride (CZT) detector) passes a current responsive to an incident photon. The analog front-end circuit 104 is coupled to the photon sensor 102 for receipt of signals indicative of photons incident on the photon detectors 112.

The analog front-end circuit 104 includes a pixel array 106 and a controller 110. The pixel array 106 is an array (e.g., a two-dimensional array) of pixel circuits 108. Each of the pixel circuits 108 is coupled to one of the photon detectors 112 for receipt and processing of signals generated by the photon detector 112 responsive to incident photons. The pixel circuits 108 count events signaled by current flow from the photon detectors 112 caused by incident photons. Each of the pixel circuits 108 may include multiple counters, where each counter accumulates events within a predetermined energy range, and may include multiple counter banks to allow accumulation of count values in one bank, while previously accumulated count values are output from another bank. The pixel array 106 is coupled to the controller 110, and the event count values accumulated in the pixel array 106 are passed to the controller 110 for processing and output.

Figure 2:
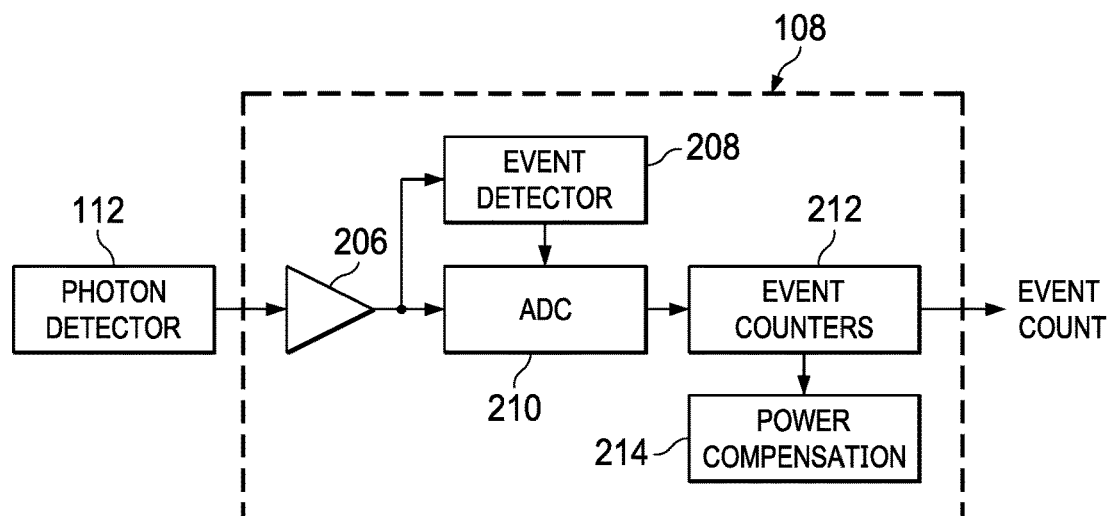
FIG. 2 illustrates a block diagram for an example channel of the photon counting system of FIG. 1.

FIG. 2 illustrates a block diagram for an example channel of the photon counting system 100. The channel includes a photon detector 112 and a pixel circuit 108. The pixel circuit 108 includes a charge sensitive amplifier 206, an event detector 208, an analog-to-digital converter (ADC) 210, and power compensation circuit 214. The charge sensitive amplifier 206 is coupled to the photon detector 112. The charge sensitive amplifier 206 converts charge received from the photon detector 112 to a voltage (a voltage pulse) representative of the energy of a photon incident on the photon detector 112. The output of the charge sensitive amplifier 206 is coupled to the event detector 208 and the ADC 210. The signal generated by the charge sensitive amplifier 206 is digitized by the ADC 210. The ADC 210 may be a successive approximation ADC, a direct-conversion ADC, or other type of ADC. Operation of the ADC 210 (i.e., digitization of the output voltage of the charge sensitive amplifier 206) is triggered by the event detector 208. The event detector 208 compares the output of the charge sensitive amplifier 206 to a threshold voltage. If the output of the charge sensitive amplifier 206 exceeds the threshold voltage, then an event is detected, and the ADC 210 is triggered to digitize the output signal of the charge sensitive amplifier 206.

The event counters 212 include one or more counters that are incremented based on the events detected by the event detector 208 and the corresponding values generated by the ADC 210. For example, an event counter 212 may be incremented with each event detected by the event detector 208, or each event detected by the event detector 208 that produces an output of the ADC 210 within a predetermined range, where different ranges define different photon energy levels. An event counters 212 may be implemented using a linear feedback shift register (LFSR), rather than a binary counter circuit, to reduce counter circuit area. Event count values accumulated by the event counters 212 are provided to the controller 110.

Figure 3:
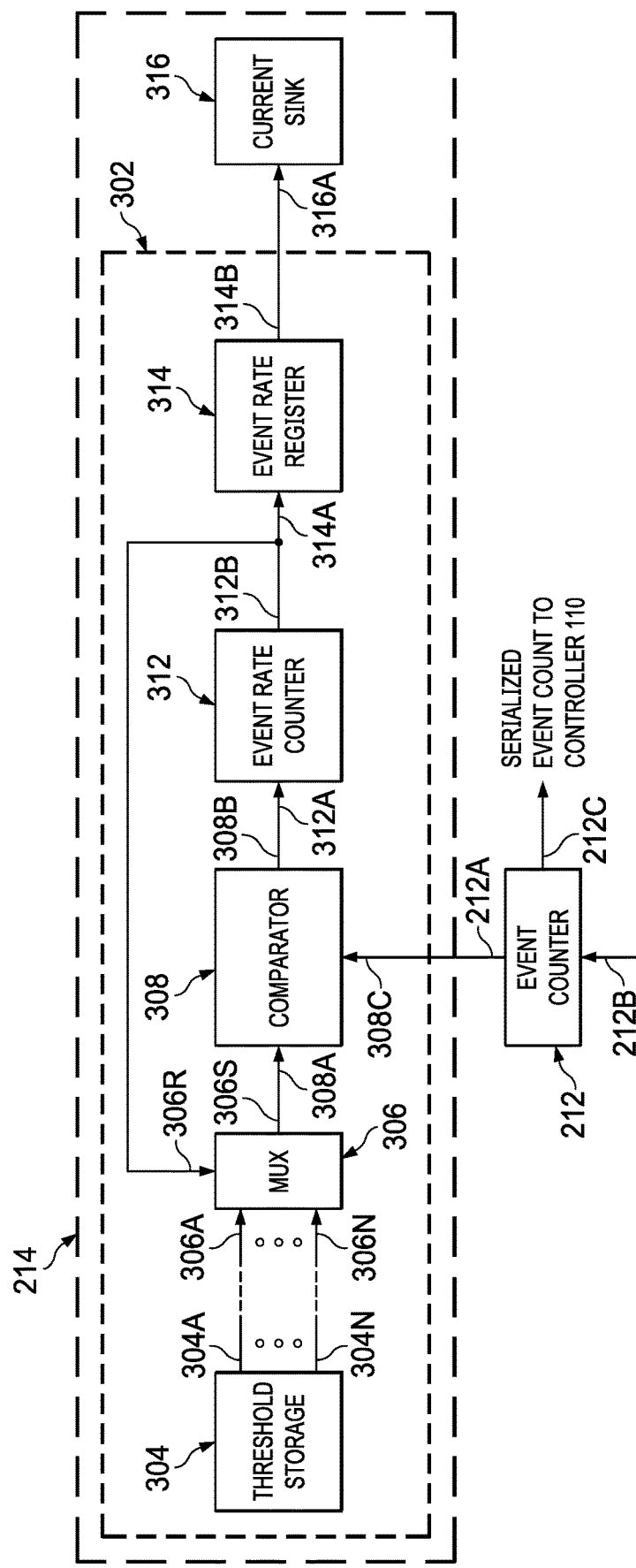
FIG. 3 illustrates a block diagram for an example power compensation circuit suitable for use in channels of the photon counting system of FIG. 1.

The power compensation circuit 214 is coupled to the event counters 212. The power compensation circuit 214 adjusts the power consumed by the pixel circuit 108 based on an event count value accumulated by the event counters 212. FIG. 3 illustrates a block diagram for an example power compensation circuit 214. The power compensation circuit 214 includes an event rate circuit 302 and a current sink circuit 316. The event rate circuit 302 determines an event rate value based on the number of events detected by the pixel circuit 108 (the number of photons incident on the photon detector 112), and the current sink circuit 316 sinks current based on the event rate value determined by the event rate circuit 302. For example, a higher event rate value corresponds to a higher number of events and a lower current passed by the power compensation circuit 214. A lower event rate value corresponds to a lower number of events and a higher current passed the power compensation circuit 214.

The event rate circuit 302 includes threshold storage 304, a multiplexer 306, a comparator 308, an event rate counter 312, and an event rate register 314. The threshold storage 304 stores threshold values, where each threshold value corresponds to an event count value produced by the event counter 212. The threshold values may be stored in the threshold storage 304 during device fabrication. If the event counter 212 is implemented as a linear feedback shifter register, then the threshold values stored in the threshold storage 304 are encoded as values of the linear feedback shift register that correspond to a desired event count value. The threshold storage 304 may store any number of threshold values suitable for determining event rate. For example, the threshold storage 304 may store eight threshold values that equally spaced over a 16-bit count range.

The threshold storage 304 is coupled to the multiplexer 306. Outputs 304A to 304N of the threshold storage 304 are coupled to threshold inputs 306A to 306N of the multiplexer 306. Each output 304A to 304N of the threshold storage 304 provides an event threshold value to the multiplexer 306. The multiplexer 306 selects one of the event threshold values provided by the threshold storage 304 to route to the comparator 308.

The comparator 308 is coupled to the multiplexer 306 and the event counter 212. The comparator 308 compares the event count value (the count output) provided by the event counter 212 to the event threshold value provided by the multiplexer 306. An input 308A of the comparator 308 is coupled to the output 306S of the multiplexer 306 for receipt of the threshold value. An input 308C of the comparator 308 is coupled to the output 212A of the event counter 212 for receipt of the event count value. The output 308B of the comparator 308 is active when the event count value received at the input 308C is equal to the event threshold value received at the input 308A. The comparator 308 may be implemented to identify when the event count value is equal to the event threshold value, rather than equal to or greater than, or equal to or less than, because the event counter 212 may be an LFSR, which provides an event count that is not monotonic.

The comparator 308 is coupled to the event rate counter 312. The output 308B of the comparator 308 is coupled to an enable input 312A of the event rate counter 312. When the output 308B of the comparator 308 is active (e.g., generating an output pulse (a logic one pulse) that indicates the event count value is equal to the threshold value), the event rate counter 312 is incremented. For example, the event rate counter 312 may be incremented by a same clock signal (not shown) as is used to clock the event counter 212. The event rate value provided at the output 312B of the event rate counter 312 is fed back to the multiplexer 306 to select the threshold value provided to the comparator 308. For example, the event rate counter 312 is initially set to a value of zero to select a lowest threshold, and the event rate counter 312 is incremented each time the event count value equals the current threshold value to select successively higher threshold values for comparison to the event count value. The selection control input 306R of the multiplexer 306 is coupled to the output 312B of the event rate counter 312.

The event rate register 314 is coupled to the event rate counter 312. The event rate register 314 stores the event rate value generated by the event rate counter 312 for use by the current sink circuit 316. For example, at the end of a photon measurement interval the event rate value generated by the event rate counter 312 may be transferred to the event rate register 314 for application by the current sink circuit 316 in a subsequent photon measurement interval.

The current sink circuit 316 sinks current based on the event rate value stored in the event rate register 314. For example, a binary event rate value may be applied to affect current sink circuit 316 (for example, by closing switches of the current sink circuit 316), where such effect on the current sink circuit 316 causes the current sink circuit 316 to sink a predetermined amount of current. In some embodiments, a first switch of the current sink circuit 316 is closed to sink current N, a second switch is closed to sink current 2N, a third switch is closed to sink current 4N, etc.

Figure 4:
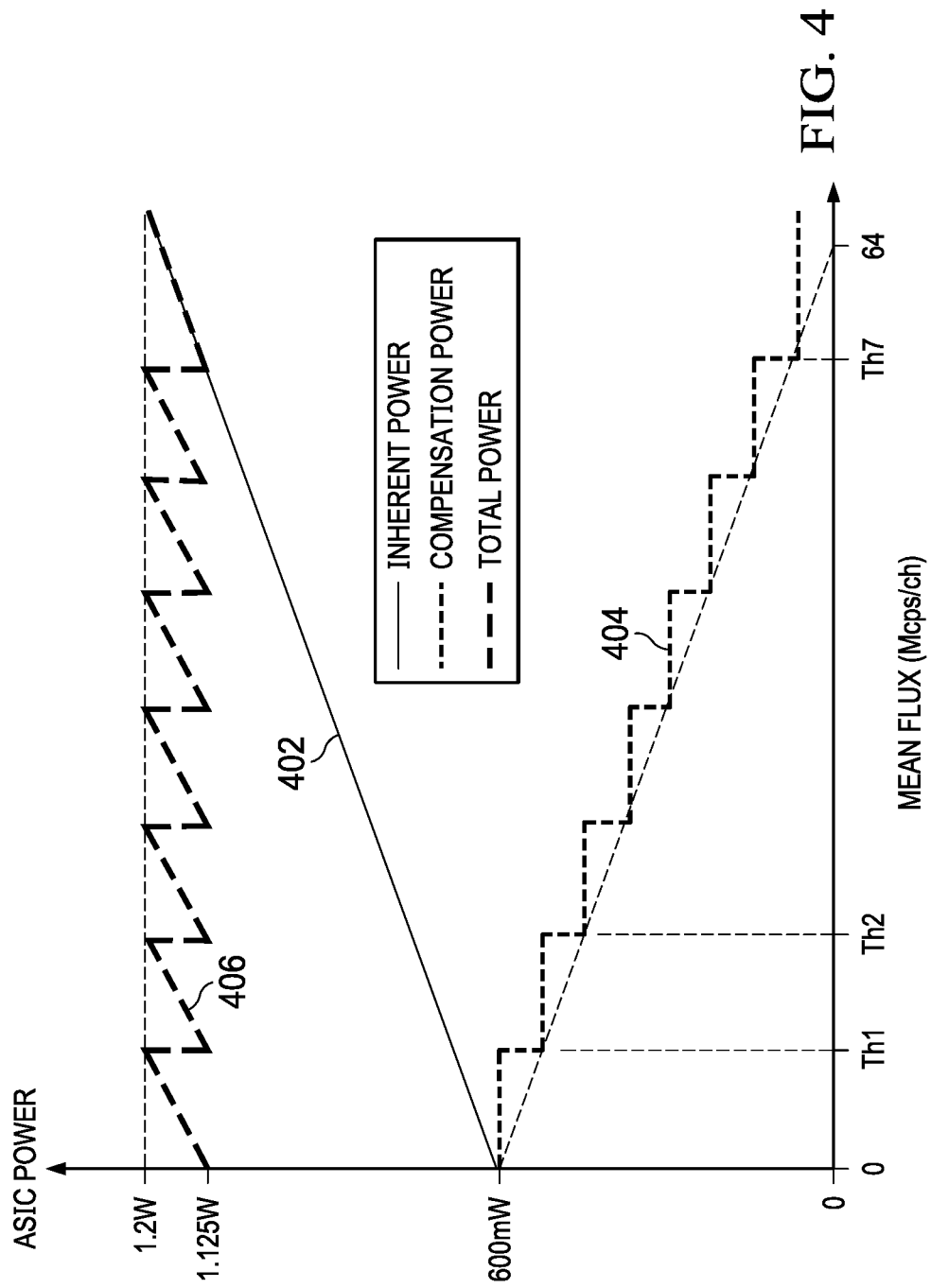
FIG. 4 shows a graph of example power compensation provided by an implementation of the power compensation circuit of FIG. 3.

FIG. 4 shows a graph of example power compensation provided by the power compensation circuit 214. In FIG. 4, the x-axis represents mean flux in the pixel array 106 expressed as millions of counts per second per pixel circuit 108 (Mcps/ch). The y-axis represents the power consumed by the pixel array 106. The power line 402 represents the power consumed by operation of the pixel circuit 108 as photon incidence increases across the photon sensor 102. Thus, the power consumed by the pixel array 106 increases with increased flux. The power steps 404 represents the power consumed by the power compensation circuit 214 in the pixel array 106 based on the event count values generated by the event counters 212 in the pixel array 106. As the power consumed by operation of the pixel circuit 108 increases, the power consumed by the power compensation circuit 214 step-wise decreases. The sawtooth 406 represents the sum of the power line 402 and the power steps 404 (the power consumed by the pixel array 106 with compensation). The sawtooth 406 shows that the power compensation circuit 214 reduces the range of power consumed in the pixel array 106 to a narrow band, which helps to eliminate temperature induced artifacts in the photon sensor 102.

While the threshold-based power compensation described above is a significant improvement over convention techniques (e.g., localized power measurement), a small variation in flux (at a threshold) can cause a substantial variation in power consumption as shown in FIG. 4. Therefore, reduction of effective compensation step size is desirable. The analog front-end circuit 104 effectively randomizes the thresholds applied to determine event rate to reduce compensation step size.

Figure 5:
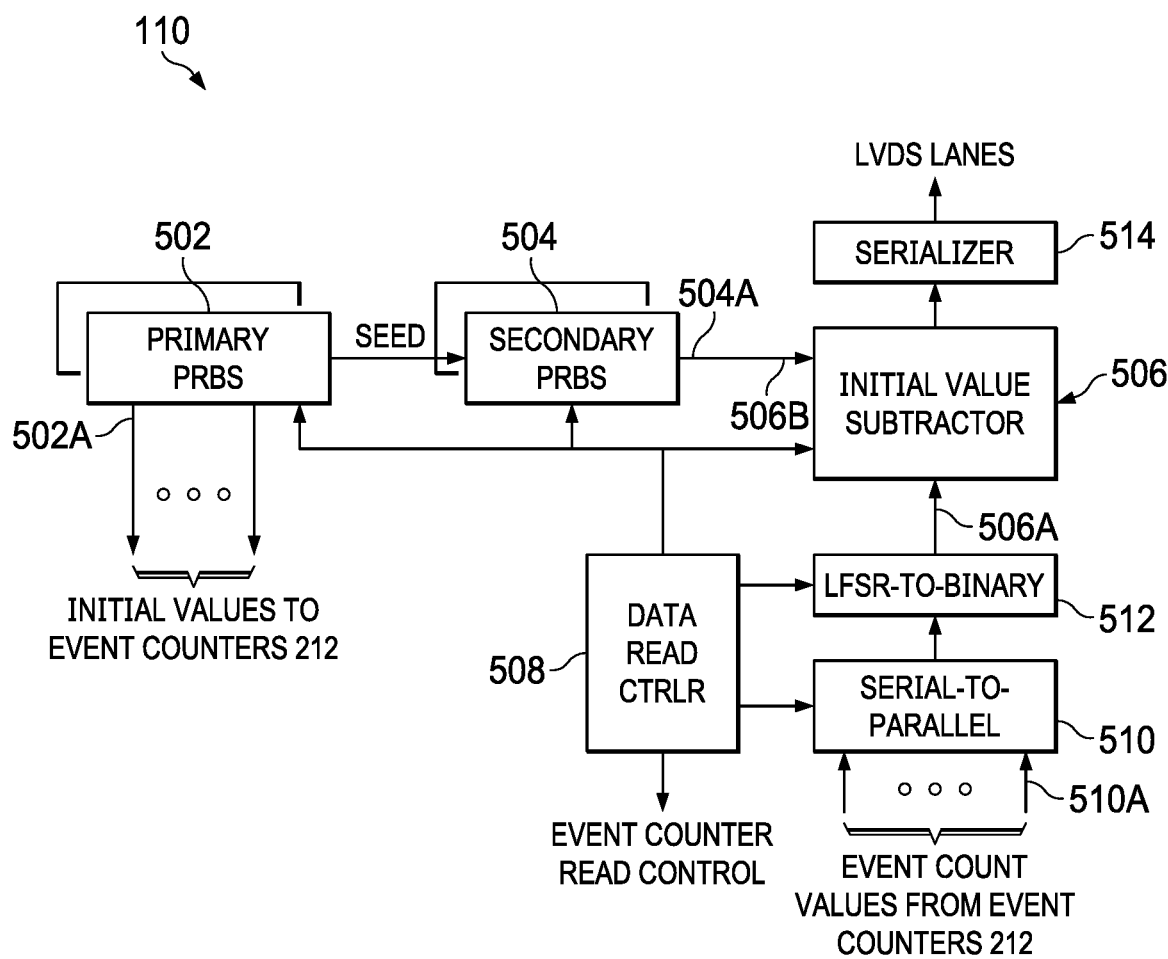
FIG. 5 shows a block diagram for an example controller circuit for use with embodiments of the power compensation circuit of FIG. 3.

FIG. 5 shows a block diagram for an example controller 110 that provides randomized compensation step size in the analog front-end circuit 104. The controller 110 includes a primary pseudo-random bit sequence (PRBS) generator 502, a secondary PRBS generator 504, an initial value subtractor 506, a data read controller 508, a serial-to-parallel converter 510, an LFSR-to-binary converter 512, and a serializer 514. The secondary PRBS generator 504 may be an instance of the primary PRBS generator 502. That is, the secondary PRBS generator 504 may be identical to the primary PRBS 502. The primary PRBS generator 502 and the secondary PRBS generator 504 may be implemented using linear feedback shift registers.

At or before the start of each photon counting interval, the event counters 212 are initialized. For example, the event counters 212 (FIG. 3) may be initialized to zero at the start of each photon counting interval in some implementations. To reduce the effective compensation step size, the primary PRBS generator 502 generates randomized initial values that are loaded into the event counters 212 via outputs 502A. For example, an initial value provided by the primary PRBS generator 502 may be shifted into the event counters 212 as the event count values are shifted out of the event counters 212 and into the serial-to-parallel converter 510 during readout. Different initial values may be loaded into subsets of the event counters 212. For example, if the pixel circuits 108 are arranged as rows and columns (as show in FIG. 1), then a different initial value may be loaded into the event counters 212 of each column. The initial values generated by the primary PRBS generator 502 may be limited to a range of values between zero and the first threshold value provided to the comparator 308 (where the first threshold value defines the lowest event threshold). The primary PRBS generator 502 may convert the initial values to LFSR count values for loading into the event counters 212. Randomization of the initial value provided to the event counters 212 has the same effect as randomizing the threshold values and requires no additional pixel circuitry. An input 212B (FIG. 3) of the event counter 212 is coupled to an output 502A of the primary PRBS generator 502 for receipt of a randomized initial value. The PRBS generator 502 is illustrated as having multiple outputs 502A. Each output 502A of the PRBS generator 502 is coupled to the event counters 212 of a column of the pixel circuits 108 (FIG. 1). A different initial value may be provided at each output 502A, and thus, a different initial value may be loaded into the event counters 212 of each column.

To provide correct event count values when applying the randomized initial values to the event counters 212, the initial value subtractor 506 subtracts the randomized initial values from the event count values read from the event counters 212. An input 506A of the initial value subtractor 506 is coupled to the output 212C of the event counter 212 via the serial-to-parallel converter 510 and the LFSR-to-binary converter 512 for receipt of event count values. An input 506B of the initial value subtractor 506 is coupled to an output 504A of the secondary PRBS generator 504 for receipt of the randomized initial value (restoration value). During readout of the event counters 212, the secondary PRBS generator 504 applies the seed value used to initialize the primary PRBS generator 502, for generation of the randomized initial values loaded into the event counters 212, to regenerate the randomized initial values for subtraction in the initial value subtractor 506.

The serial-to-parallel converter 510 may include multiple inputs 510A, where each input 510A is coupled to the event counters 212 of a different column of pixel circuits 108. Similarly, transfers of parallel data to and from the serial-to-parallel converter 510, the LFSR-to-binary converter 512, the initial value subtractor 506, and the serializer 514 may be provided in multiple columnar streams.

The data read controller 508 manages the transfer of event count values from the event counters 212 to the controller 110, and provides the timing (clock) and control signals that sequence initialization and read-out of the event counters 212. For example, the data read controller 508 enables the event counters 212 of each column of pixel circuits 108 to shift the event count values into the serial-to-parallel converter 510. Each event count value shifted into the serial-to-parallel converter 510 is presented in parallel form to the LFSR-to-binary converter 512, and the LFSR-to-binary converter 512 converts the event count values (LFSR values) to binary values. For example, the LFSR-to-binary converter 512 may include a look-up table for conversion of LFSR values to binary values. The initial value subtractor 506 subtracts the randomized initial value applied in the event counters 212 from the binary version of the error count value. The initial value subtractor 506 provides the result of subtraction to the serializer 514, and the serializer 514 serializes the result of the subtraction for transfer to circuitry external to the analog front-end circuit 104 (e.g., circuitry that processes the event count values to characterize an object being imaged).

Some implementations of the controller 110 may include multiple primary PRBS generators 502 and multiple secondary PRBS generators 504 where an instance of the primary PRBS generator 502 and an instance of the secondary PRBS generator 504 is assigned to each column of the pixel circuits 108. Different seed values may be applied in each of the primary PRBS generators 502.

Figure 6A:
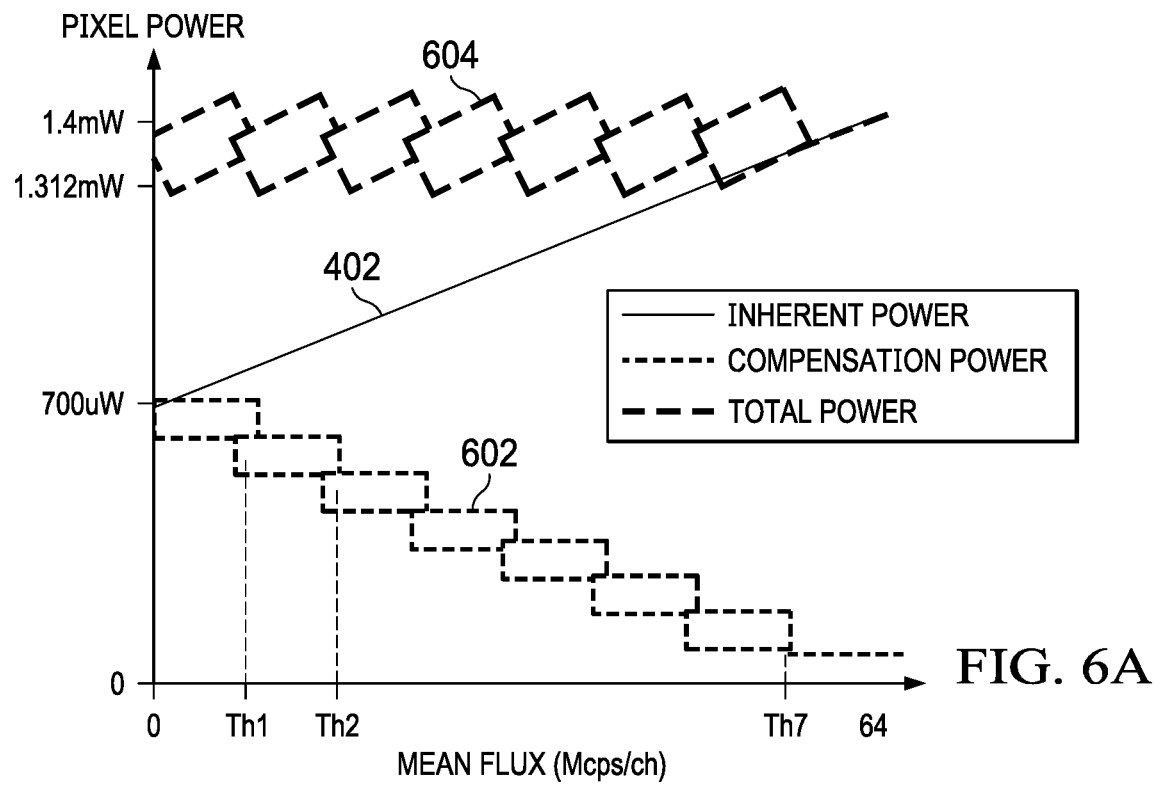
FIGS. 6A and 6B show graphs of example power compensation using the controller circuit of FIG. 5 with the power compensation circuit of FIG. 3.
Figure 6B:
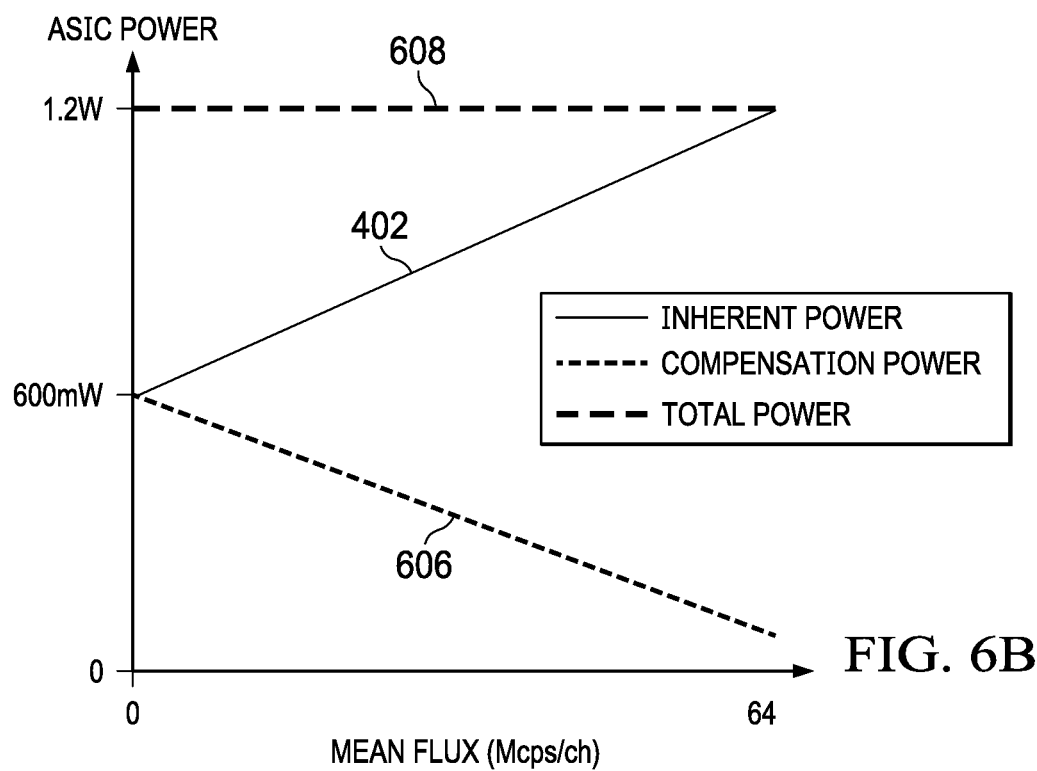

FIGS. 6A and 6B show graphs of example power compensation using the randomized initial values provided by the controller 110. In FIGS. 6A and 6B, the x-axis represents mean flux in the pixel array 106 expressed as millions of counts per second (Mcps/s) per pixel circuit 108. The y-axis represents the power consumed by the pixel array 106. The power line 402 represents the power consumed by operation of the pixel circuits 108 as photon incidence increases across the photon sensor 102. Thus, the power consumed by the pixel array 106 increases with increased flux. The dithered power steps 602 represent the power consumed by the power compensation circuit 214 in the pixel array 106 based on the event count values generated by the event counters 212 in the pixel array 106. Use of the randomized initial values randomizes the power consumed by the power compensation circuit 214 and tends to smooth the power consumed by the power compensation circuit 214 over time as represented by the signal 606 of FIG. 6B. The dithered power sawtooth 604 represents the sum of the power line 402 and the dithered power steps 602 (the power consumed by the pixel array 106 with compensation). The signal 608 represents the sum of the power line 402 and the signal 606.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While particular transistor structures are referred to above, other transistors or device structures may be used instead. For example, other types of transistors (such as metal-oxide-silicon, MOSFET) may be utilized in place of the transistors shown. Additionally, the transistors may be implemented NPN transistors, PNP transistors, pMOSFETs and/or nMOSFETS. The capacitors may be implemented using different device structures (such as metal structures formed over each other to form a parallel plate capacitor) or may be formed on layers (metal or doped semiconductors) closer to or farther from the semiconductor substrate surface.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronics or semiconductor component.

Modifications are possible in the described embodiments, and other embodiments are possible, within the scope of the claims.

What is claimed is:

1. An analog front-end circuit, comprising:
an array of pixel circuits, each pixel circuit including:
   an event counter;
   a power compensation circuit including:
      an event rate circuit including:
         threshold storage;
         an event count comparator including:
            a first input coupled to the event counter;
            a second input coupled to the threshold storage; and
            an output; and
         an event rate counter including:
            an input coupled to the output of the event count comparator; and
            an output; and
      a current sink circuit coupled to the output of the event rate counter.

2. The analog front-end circuit of claim 1, further comprising:
a multiplexer comprising:
threshold inputs coupled to the threshold storage;
a selection control input coupled to the output of the event counter; and
an output coupled to the first input of the event count comparator.

3. The analog front-end circuit of claim 1, further comprising a pseudo-random binary sequence (PRBS) generator having an output coupled to an input of the event counter.

4. The analog front-end circuit of claim 3, wherein:
the PRBS generator is as a first PRBS generator; and
the analog front-end circuit includes a second PRBS generator.

5. The analog front-end circuit of claim 4, further comprising:
a subtractor including:
a first input coupled to the output of the event counter; and
a second input coupled to an output of the second PRBS generator.

6. The analog front-end circuit of claim 1, wherein the event counter includes a linear feedback shift register.

7. The analog front-end circuit of claim 1, wherein the power compensation circuit includes:
an event rate register including:
an input coupled to the output of the event rate counter; and
an output coupled to the current sink circuit.

8. An analog front-end circuit, comprising:
an array of pixel circuits, each pixel circuit including:
an event counter configured to count photon detection events at the pixel circuit;
a power compensation circuit coupled to the event counter and including:
an event rate circuit configured to determine a rate of photon detection events at the pixel circuit; and
a current sink circuit coupled to the event rate circuit and configured to sink a compensation current having a compensation current value based on the rate of photon detection events at one or more pixel circuits.

9. The analog front-end circuit of claim 8, wherein the event rate circuit includes:
threshold storage configured to store event threshold values; and
an event count comparator configured to compare the event threshold values to a count output of the event counter.

10. The analog front-end circuit of claim 8, wherein the event counter includes a linear feedback shift register.

11. The analog front-end circuit of claim 8, wherein the event rate circuit includes an event rate counter configured to increment an event rate value responsive to the count output equaling one of the event threshold values.

12. The analog front-end circuit of claim 11, wherein:
the event rate circuit includes an event rate register configured to store the event rate value; and
the current sink circuit is configured to select the compensation current based on the event rate value stored in the event rate register.

13. The analog front-end circuit of claim 11, wherein the event rate circuit includes a multiplexer configured to select, based on the event rate value, one of the event threshold values to compare to the count output of the event counter.

14. The analog front-end circuit of claim 11, further comprising a pseudo-random binary sequence (PRBS) generator configured to generate an initial value loaded into the event counter.

15. The analog front-end circuit of claim 14, wherein:
the PRBS generator is a first PRBS generator; and
the analog front-end circuit includes:
a second PRBS generator configured to generate a restoration value based on a seed value applied by the first PRBS generator to generate the initial value.

16. The analog front-end circuit of claim 15, further comprising a subtractor configured to subtract the restoration value from the event rate value.

17. A photon counting system, comprising:
a photon sensor comprising a plurality of photon detectors; and
an analog front-end circuit coupled to the photon sensor, the analog front-end circuit including:
an array of pixel circuits, each pixel circuit including:
an event counter configured to count photons incident at one of the photon detectors; and
a power compensation circuit coupled to the event counter and including:
an event rate circuit configured to determine a rate of photon detection events at the pixel circuit; and
a current sink circuit configured to sink a compensation current having a compensation current value based on the rate of photon detection events; and
a pseudo-random binary sequence (PRBS) generator coupled to the event counter and configured to generate an initial value loaded into the event counter.

18. The photon counting system of claim 17, wherein the event rate circuit includes:
threshold storage configured to store event threshold values; and
an event count comparator configured to compare the event threshold values to a count output of the event counter.

19. The photon counting system of claim 18, wherein:
the event rate circuit includes:
an event rate counter configured to increment an event rate value responsive to the count output equaling one of the event threshold values;
an event rate register configured to store the event rate value; and
a multiplexer configured to select, based on the event rate value, one of the event threshold values to compare to the count output of the event counter.

20. The photon counting system of claim 19, wherein the current sink circuit is configured to select the compensation current based on the event rate value stored in the event rate register.

21. The photon counting system of claim 17, wherein:
the PRBS generator is a first PRBS generator; and
the analog front-end circuit includes:
a second PRBS generator configured to generate a restoration value based on a seed value applied by the first PRBS generator to generate the initial value; and
a subtractor configured to subtract the restoration value from the event rate value.

* * * * *